(12) United States Patent
Chang

(10) Patent No.: US 9,182,880 B2
(45) Date of Patent: *Nov. 10, 2015

(54) METHOD OF DISPLAYING IMAGES VIA TOUCHING AND ELECTRONIC APPARATUS THEREOF

(71) Applicant: GETAC TECHNOLOGY CORPORATION, Hsinshu County (TW)

(72) Inventor: Chin-Jung Chang, New Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/908,981

(22) Filed: Jun. 3, 2013

(65) Prior Publication Data

US 2014/0104229 A1 Apr. 17, 2014

(30) Foreign Application Priority Data

Oct. 16, 2012 (CN) .......................... 2012 1 0391103

(51) Int. Cl.
  *G06F 3/045* (2006.01)
  *G06F 3/0481* (2013.01)
  *G06F 3/041* (2006.01)
  *G06F 9/44* (2006.01)

(52) U.S. Cl.
  CPC ............ *G06F 3/0481* (2013.01); *G06F 3/0416* (2013.01); *G06F 9/4443* (2013.01)

(58) Field of Classification Search
  CPC .... G06F 3/0481; G06F 3/0416; G06F 9/4443

USPC .......................................................... 345/173
See application file for complete search history.

(56) References Cited

U.S. PATENT DOCUMENTS

| | | | |
|---|---|---|---|
| 4,725,694 A | 2/1988 | Auer et al. | |
| 6,094,197 A | 7/2000 | Buxton et al. | |
| 6,784,873 B1 | 8/2004 | Boesen et al. | |
| 2006/0197675 A1 | 9/2006 | Liu | |
| 2007/0239921 A1 | 10/2007 | Toorians et al. | |
| 2007/0257892 A1 | 11/2007 | Hu et al. | |
| 2008/0174570 A1* | 7/2008 | Jobs et al. ..................... | 345/173 |
| 2009/0063837 A1* | 3/2009 | Shayer et al. ..................... | 713/2 |
| 2010/0275003 A1* | 10/2010 | Hsu et al. ......................... | 713/2 |
| 2010/0275004 A1 | 10/2010 | Hsu et al. | |
| 2011/0078786 A1* | 3/2011 | Kwong et al. ................... | 726/18 |
| 2011/0131400 A1* | 6/2011 | Chiu et al. ....................... | 713/2 |
| 2013/0080891 A1* | 3/2013 | Byun ............................ | 715/704 |
| 2013/0198502 A1 | 8/2013 | Rothman et al. | |
| 2014/0085224 A1 | 3/2014 | Chang | |
| 2014/0085228 A1 | 3/2014 | Chang | |

\* cited by examiner

*Primary Examiner* — Towfiq Elahi

(57) ABSTRACT

A method of displaying images via touching and an electronic apparatus thereof are provided. The method includes the following steps. A basic input/output system (BIOS) is loaded to execute an initialization program of the electronic apparatus, where the electronic apparatus has not loaded an operating system. The touch display module is defined to include a human interface device, and the touch display device has a virtual input area, and an input interface is displayed at the virtual input area. A touch event is generated when the touch display device is touched, and a coordinate value is generated according to the touch event. When the coordinate value locates in the input interface, the coordinate value corresponds to a functional code of the human interface device, and a corresponding operation is executed according to the functional code.

18 Claims, 5 Drawing Sheets

METHOD OF DISPLAYING IMAGES VIA TOUCHING AND ELECTRONIC APPARATUS THEREOF

BACKGROUND

1. Technical Field

The present invention relates generally to an electronic apparatus, and more particularly to an electronic apparatus capable of providing an input function during an initialization stage and a method of displaying images via touching thereof.

2. Related Art

Recently, the touch screen has become one common technology in the daily lives, and the touch screen can be found in an electronic device such as mobile phone, tablet computer, automatic teller machine (ATM), and the personal digital assistant (PDA). Because the touch screen can provide people with an operating experience which is more convenient than that of traditional physical keys, making the electronic device to be designed to have fewer physical keys. However, even though the touch screen brings users high extent conveniences, the users may feel inconvenient when operating the electronic device sometimes due to the insufficient physical keys.

For example, when the user needs to input commands into the electronic device having a touch screen during the initialization and the driver of the electronic apparatus has not been loaded (e.g., the stage for selecting a boot mode), the electronic device itself may not have a sufficient amount of physical keys for the user to operate. Accordingly, the user can not input some required commands and feels inconvenient during the initialization process.

SUMMARY

The present invention provides an electronic apparatus and a method of displaying images via touching thereof, capable of providing an input function for a user when the electronic apparatus executes an initialization and the driver program of the touch screen has not been loaded by the operating system.

An embodiment of the present invention provides an electronic apparatus including a processor and a touch display module. The processor executes an operating system, and loads a basic input/output system (BIOS) to execute an initialization program. The touch display module includes a touch display device and a touch input controller. The touch display device has a virtual input area, and the touch display device generates a touch event as being touched. The touch input controller is coupled to the touch display device and the processor, and receives the touch event and generates a coordinate value according to the touch event. When the electronic apparatus loads the initialization program and has not loaded the operating system, the touch display module is defined to include a human interface device, and the virtual input area displays an input interface. When the coordinate value locates in the input interface, the touch input controller transforms the coordinate value into a functional code of the human interface device, and the processor executes a corresponding operation according to the functional code.

Another embodiment of the present invention provides a method of displaying images via touching, which is adapted to an electronic apparatus, where the electronic apparatus has a touch display module, the touch display module has a touch display device, and the method of displaying images via touching includes following steps. First, a basic input/output system (BIOS) is loaded to execute an initialization program of the electronic apparatus, where the electronic apparatus has not loaded an operating system. The touch display module is defined to have a human interface device, and the touch display device has a virtual input area. An input interface is displayed at the virtual input area. A touch event is generated when the touch display device is touched. A coordinate value is generated according to the touch event. The coordinate value is transformed into a functional code of the human interface device when the coordinate value locates in the input interface, and a corresponding operation is executed according to the functional code.

In another embodiment of the present invention, the method further includes defining the touch display module as a touch screen after the electronic apparatus loads the operating system.

In another embodiment of the present invention, defining the touch display module to have the human interface device includes defining the touch display module to include the human interface device and a touch screen when the electronic apparatus has not loaded the operating system.

In another embodiment of the present invention, the touch display device further includes a touch region, the touch region is not overlapped with the virtual input area, and when the coordinate value locates in the touch region, the processor executes an operation according to the coordinate value, where the human interface device corresponds to the virtual input area, and the touch screen corresponds to the touch region.

In another embodiment of the present invention, executing the initialization program of the electronic device includes controlling the electronic device to load the initialization program to execute an initialization operation.

In another embodiment of the present invention, the human interface device is a keyboard.

In another embodiment of the present invention, the input interface displayed by the virtual input area includes a plurality of functional key icons, and each of the functional key icons corresponds to a key of the keyboard.

In another embodiment of the present invention, when the coordinate value locates outside of the input interface, the coordinate value does not correspond to any functional code of the human interface device.

In another embodiment of the present invention, executing the corresponding operation according to the functional code includes executing a functional key function according to the functional code.

In summary, by using the electronic apparatus and the method of displaying images via touching thereof provided in the embodiments of the present invention, the user can still input commands to the electronic apparatus through the input interface when the electronic apparatus is initializing and has not loaded the operating system. Accordingly, when the user operates the electronic apparatus, the efficiency and flexibility are enhanced.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a better understanding of the present invention, and are incorporated in and constitute a part of this specification. The drawings illustrate embodiments of the present invention and, together with the description, serve to explain the principles of the present invention.

DETAILED DESCRIPTION OF DISCLOSED EMBODIMENTS

Figure 1:
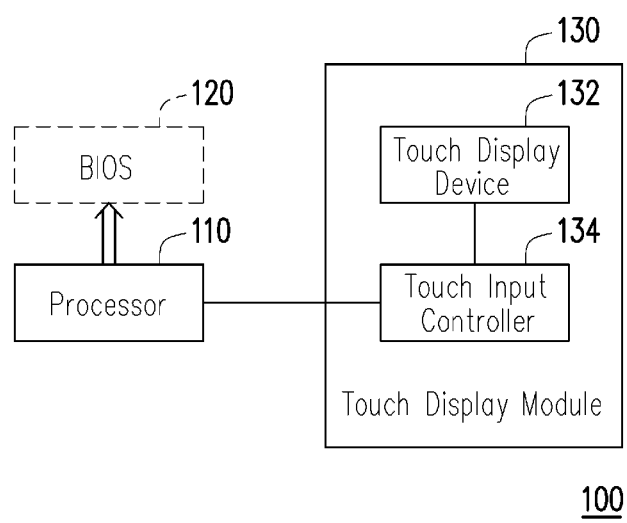
FIG. 1 is a functional block diagram of an electronic apparatus according to an embodiment of the present invention.

FIG. 1 is a functional block diagram of an electronic apparatus according to an embodiment of the present invention. With reference to FIG. 1, in the present embodiment, an electronic apparatus 100 includes a processor 110 and a touch display module 130. The processor 110 executes an operating system and loads a basic input/output system (BIOS) 120 to execute an initialization program. The operating system can be, for example, Windows, Linux and Mac OS X, etc. The processor 110 may be a central processing unit (CPU). Moreover, in some embodiments, the processor 110 may include the functions of a north bridge chip and a south bridge chip, or a hardware component such as a micro controller unit (MCU), a processing chip, or a computer system, or a software component capable of signal processing functions (e.g., a signal processing application program). Moreover, the processor 110 may also be a combination of hardware and software components, although the possible implementations in the present invention are not limited thereto.

The BIOS 120 may comprise a program code stored in a memory (not drawn), and the processor 110 may access the program code of the BIOS 120 in the memory in order to execute the initialization program. For example, when the electronic apparatus 100 is being initialized, the processor 110 (e.g. the CPU) may execute the program code of the BIOS 120. In addition, the BIOS 120 may include one of hardware, software, or firmware, or a combination thereof, although the present invention is not limited thereto.

The initialization program may initialize components such as chipsets and memory subsystems, although the present invention is not limited thereto. On the other hand, the processor 110 may perform diagnostics on hardware components such as keyboard, hard drive, and input/output ports in order to ensure these hardware components can be initialized and operate normally. The touch display module 130 includes a touch display device 132 and a touch input controller 134. The touch input controller 134 is coupled to the processor 110 and the touch display device 132. The touch display device 132 may be a capacitive, resistive, or wave-based implemented touch screen, although the present invention is not limited thereto. In other embodiments, the touch input controller 134 can be, for example, coupled to the processor 110 through a north chip (not shown) or a south chip (not shown).

In order to enhance the flexibility and convenience of operating the electronic apparatus 100, a virtual input area of the touch display device 132 can be used to implement a virtual input function such as virtual keyboard function, so that the user can perform more diverse input operations. Therefore, when the functions provided by the physical buttons of the electronic apparatus 100 cannot fulfill the needs of the user, the user can input commands to the electronic apparatus 100 by the virtual input function (e.g., the virtual keyboard).

In one embodiment, when the processor 110 in the electronic apparatus 100 (e.g. a rugged tablet computer) loads the BIOS 120 and executes the initialization programs, the user may need to carry out some settings, to make the processor 110 perform the corresponding initialization operations according to user's settings when the processor 110 executes the program code of the BIOS 120. However, during the initialization process, since the operating system of the electronic apparatus 100 has not loaded the driver of the touch display module 130, the user cannot input operations into the electronic apparatus 100 through the undriven touch display module 130. At this time, the touch display module 130 of the electronic apparatus 100 may be defined as a human interface device (HID) providing equivalent functions as those of a physical keyboard and a physical mouse. In other words, from the viewpoint of the BIOS 120 and the processor 110, the type of signals transmitted by the HID is the same as that of the signals transmitted by the physical keyboard (for example, American standard code for information interchange (ASCII).

Next, the touch display device 132 in the electronic apparatus 100 can display an input interface (e.g., a virtual keyboard or a virtual keypad) in the virtual input area, so that the user can perform touch input operations, for example, through the input interface. Moreover, a plurality of functional key icons (e.g., the ESC, ENTER, UP (↑), DOWN (↓), LEFT (←), RIGHT (→) keys in the keyboard) may be shown in the input interface, and the functional key icons respectively has a corresponding functional code, for example, ASCII code, though the present invention is not limited thereto.

When the virtual input area of the touch display device 132 is touched, the touch display device 132 can accordingly generate a touch event. So the touch input controller 134 can receive the touch event and generate a corresponding coordinate value of the touch display device 132 according to the touch event. After the corresponding coordinate value of the touch event is generated, the touch input controller 134 obtains the functional key touched by the user according to a location of the functional key icon corresponding to the coordinate value on the input interface, and accordingly generates a functional code corresponding to the touched functional key. Then, the touch input controller 134 transmits the functional code to the processor 110, such that the processor 110 may execute an operation associated with the touched functional key.

In brief, under the situation that the touch display module 130 is defined as the HID, when the user touches the functional key of the input interface, the achieved function would be the same as pressing a physical key of the keyboard.

For example, when the user touches a virtual "ESC" key on the virtual keyboard (i.e. the input interface) displayed on the touch display device 132, the touch input controller 134 would detect that the user wants to input a command corresponding to the "ESC" key according to the coordinate value of a location touched by the user. Then, the touch input controller 134 may transform the "ESC" command into a functional code of 27 (decimal), 1B (hexadecimal), or 033 (octal) corresponding to the "ESC" key in the ASCII code. And then, the touch display module 130 transmits the functional code to the processor 110, such that the processor 110 may execute a function of the functional key corresponding to the functional code (for example, leaving a certain menu), etc.

Moreover, when the electronic device 100 executes the initialization program and has not loaded the operating system, the touch display module 130 further defines a touch screen while defining the HID (for example, a keyboard). Then, the touch display module 130 may further define a touch region at a region non-overlapping with the virtual input area to correspond to the touch screen. Therefore, besides that the user may operate the electronic apparatus 100 through the virtual input area, the user may also perform other operations through the touch region, which improves operation flexibility of the electronic apparatus 100.

On the other hand, when a location touched by the user on the touch display device 132 is outside the region of the input interface (for example, the virtual keyboard), since it is equivalent to a situation that the keys of the physical keyboard are not pressed, the touch display module 130 will not generate a corresponding functional code according to the coordinate value of the current touch event. At this time, the coordinate value may be transmitted to the processor 110. When the processor 110 receives the coordinate value, it learns that the received coordinate value does not correspond to any functional code through, for example, a signal type determining function, and hence the processor 110 may execute other function associated with the coordinate value or does not execute any function.

Accordingly, during the stage where the electronic apparatus 100 has executed the initialization program and has not initialized the operating system, the user can still input operations onto the electronic apparatus 100 through the input interface of the touch display device 132.

Therefore, the user's operations are not limited by the functions provided by the originally available physical keyboard of the electronic apparatus 100. In some embodiments, the physical keyboard may be optional, and hence the electronic apparatus 100 may be implemented without the physical keyboard. In another embodiment, after the electronic apparatus 100 completes the initialization program, the processor 110 may execute and load, for example, the Windows operating system to provide the user with other required functions. At this time, the operating system may define the touch display module 130 as a touch screen by mounting a driver, so as to facilitate the user using the other functions provided by the operating system.

Figure 2A:
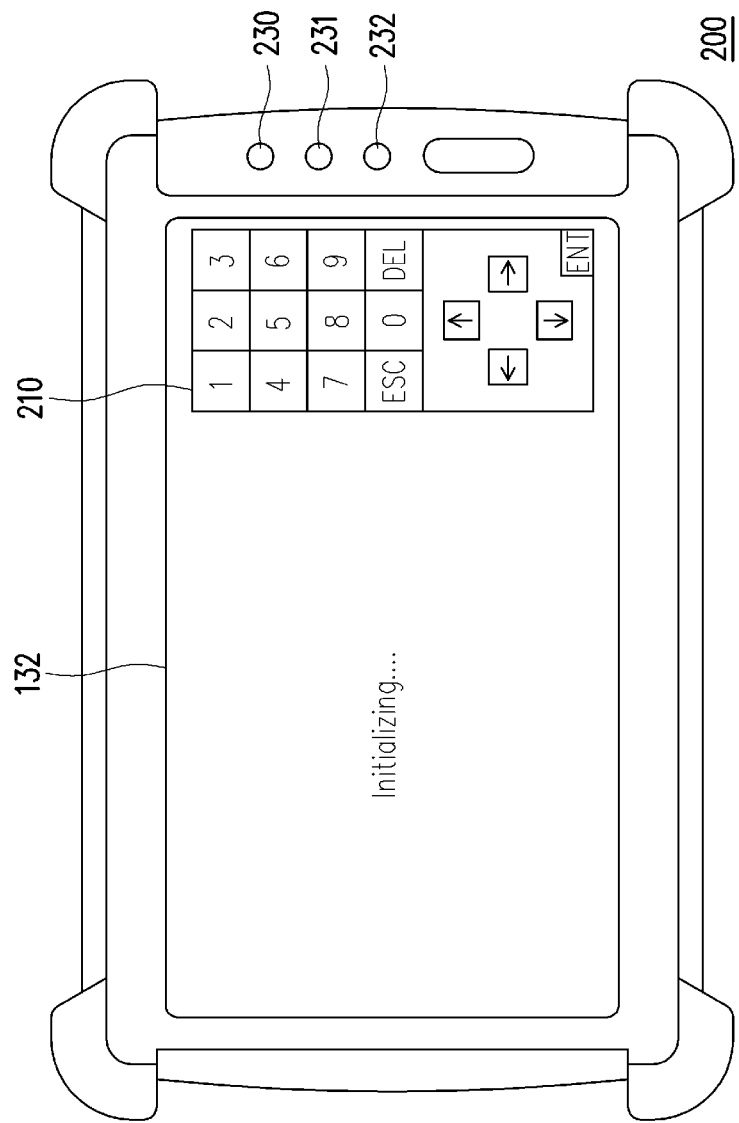
FIG. 2A is a schematic view of an input interface displayed on an electronic apparatus according to another embodiment of the present invention.

FIG. 2A is a schematic view of an input interface displayed on an electronic apparatus according to another embodiment of the present invention. In the present embodiment, the electronic apparatus 200 may include the physical keys 230-232 and the input interface shown on the screen of the display device 132 is implemented by a virtual numeric keyboard 210, for instance. The virtual numeric keyboard 210 may be displayed on a right side of the touch display device 132 for user's convenience. Therefore, when the electronic apparatus 200 is being initialized, the user can control objects such as a menu through the ESC, UP (↑), DOWN (↓), LEFT (←), RIGHT (→) ENT (enter) and DEL (delete) keys in the virtual numeric keyboard 210. For example, when the user touches the UP (↑) key, a highlighted portion of the menu may be upwardly shifted, or, when the user touches the DOWN (↓) key, the highlighted portion of the menu may be downwardly shifted. For another example, when the user touches the ESC key, the menu may be correspondingly closed.

Figure 2B:
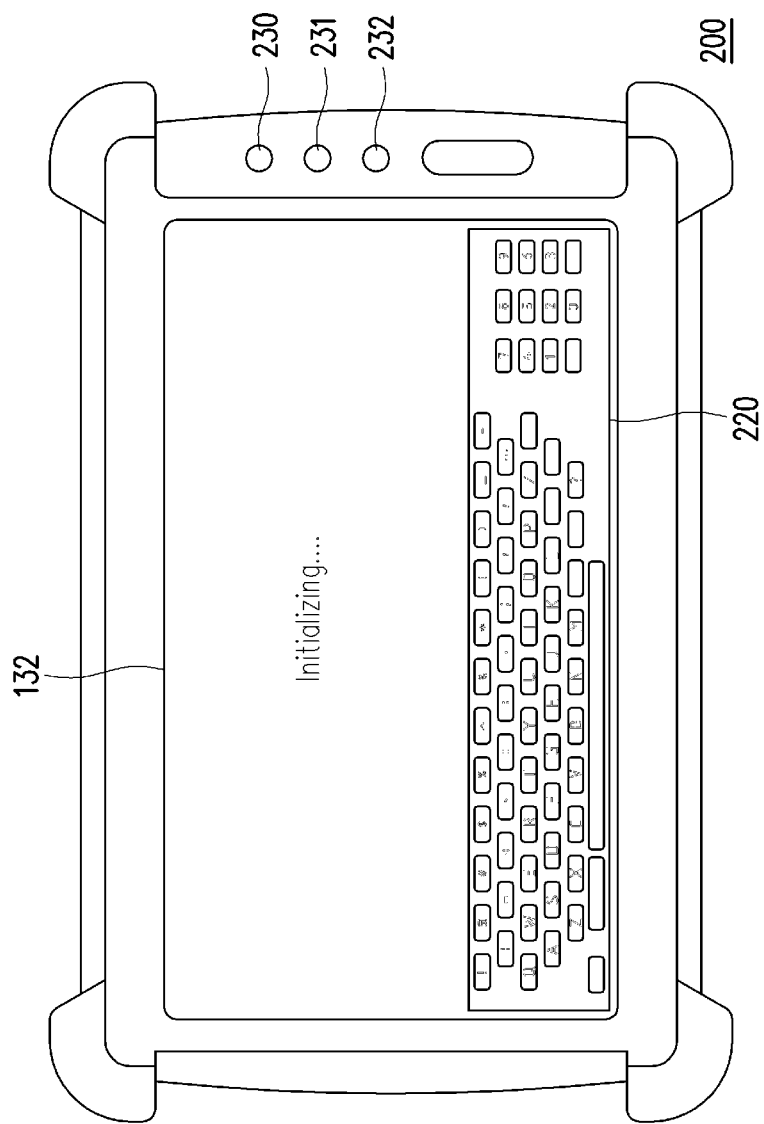
FIG. 2B is a schematic view of an input interface displayed on an electronic apparatus according to another embodiment of the present invention.

FIG. 2B is a schematic view of an input interface displayed on an electronic apparatus according to another embodiment of the present invention. In the present embodiment, the input interface may be implemented by a virtual keyboard 220. The virtual keyboard 220 may be displayed at a lower part of the touch display device 132 for user's convenience. Therefore, when the electronic apparatus 200 is being initialized, the user may also input commands to the electronic apparatus 200 through the virtual keys in the virtual keyboard 220.

As well known by people skilled in the art, the displayed location of the aforementioned input interface (e.g., the virtual numeric keyboard 210 and the virtual keyboard 220) on the touch display device 132 and the placement of the functional key icons may be adjusted according to the requirements of different designs, and embodiments of the present invention are not limited thereto.

Figure 3:
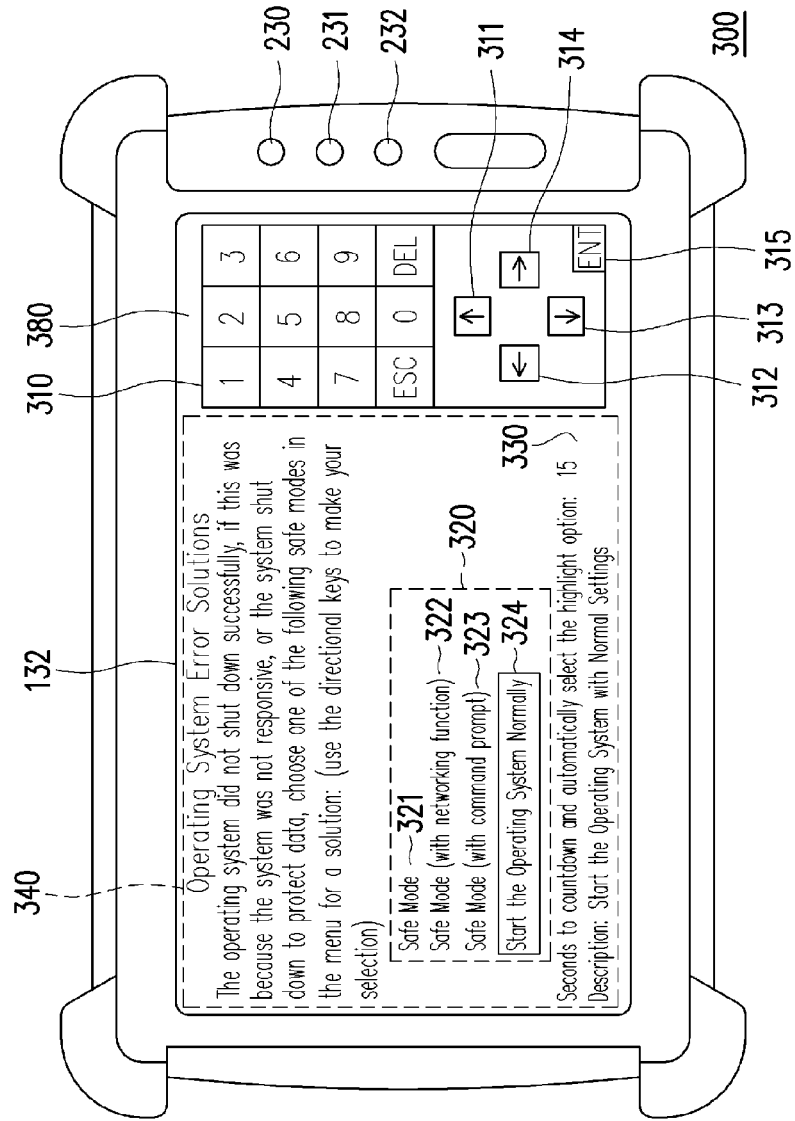
FIG. 3 is a schematic view of inputting with an input interface during an initialization stage according to another embodiment of the present invention.

FIG. 3 is a schematic view of inputting with an input interface during an initialization stage according to another embodiment of the present invention. In the present embodiment, when an abnormal shutdown occurs in the electronic apparatus 300 during a previous operation, a displayed screen 380 in FIG. 3 may be shown in the touch display device 132 during the initialization stage of the next boot up. Accordingly, the user can select whether to load the operating system in a safe mode, for example. In FIG. 3, the displayed screen of the touch display device 132 includes a menu 320 which includes a plurality of options 321-324. When the situation as shown as FIG. 3 occurs, the user can select an option through the directional keys 311-314 in a virtual numeric keyboard 310, and the user can execute the operation corresponding to the selected option by an ENT key 315 (the Enter key). Therefore, the user can execute the operation corresponding to the selected option before a countdown of a remaining time 330 (e.g. 15 seconds) is completed. So the convenience of the user operation can be enhanced and operating time is reduced.

Moreover, the touch display module 130 may further define a touch region 340 at a region non-overlapping with the virtual digital keyboard 310 (i.e. the virtual input area). In this way, besides that the user may perform input operations through the virtual digital keyboard 310, the user may also perform input operations through the touch region 340. For example, the touch display device 132 may display a power button for restarting or turning off the electronic apparatus 100 at a place (for example, a corner) of the touch region 340. When the user touches the power button, the electronic apparatus 100 may be directly restarted or turned off, but the present invention is not limited thereto.

Figure 4:
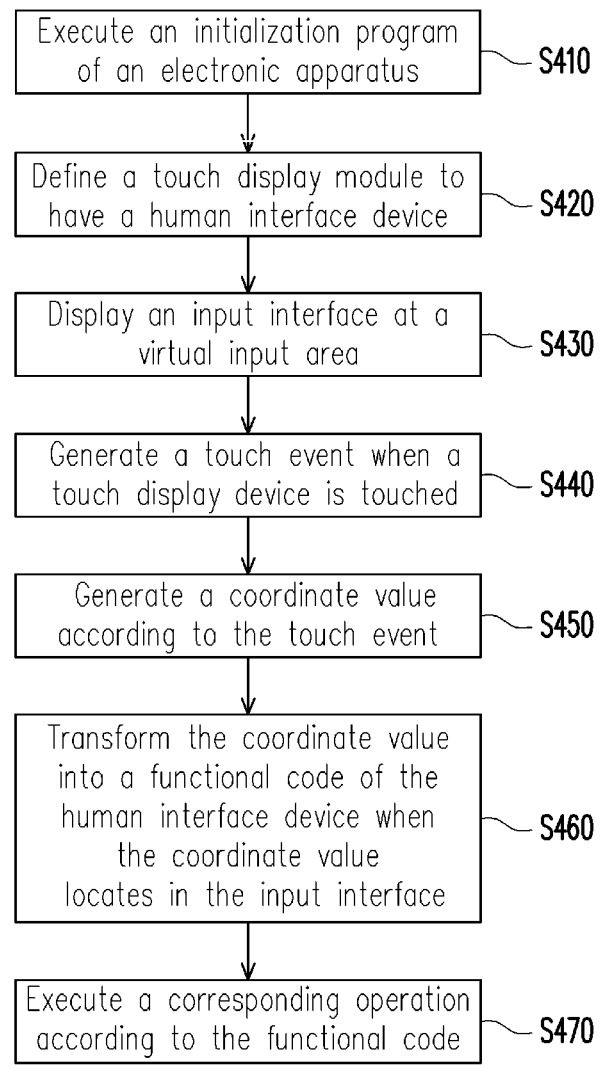
FIG. 4 is a flow chart of a method of displaying images via touching according to another embodiment of the present invention.

FIG. 4 is a flow diagram of a method of displaying images via touching according to another embodiment of the present invention, in which the method of displaying images via touching may be executed by the electronic apparatus in FIG. 1. In step S410, the processor 110 loads the BIOS 120 to execute an initialization program to perform an initialization of the electronic apparatus 100. In step S420, the touch display module 130 is defined to include an HID. In step S430, the touch display device 132 displays an input interface (for example, a virtual keyboard) in a virtual input area thereof. In step S440, when the touch display device 132 is touched, the touch display device 132 generates a touch event. In step S450, the touch display device 132 generates a coordinate value according to the touch event. In step S460, if the coordinate value is in the input interface, the touch input controller 134 transforms the coordinate value into a functional code of the HID (for example, ASCII code). In step S470, the processor 110 executes a corresponding operation according to the functional code corresponding to the coordinate value.

In view of the foregoing, by using the electronic apparatus and the method of displaying images via touching thereof provided in the embodiments of the present invention, the user can still operate on the objects in the menu, for example, through the input interface displayed by the touch display device during the initialization stage of the electronic apparatus. Accordingly, even when the physical buttons on the electronic apparatus have insufficient functions, the user can still input commands to the electronic apparatus through the virtual input interface during the system initialization stage. Therefore, the operational efficiency and flexibility of the electronic apparatus can be enhanced.

It will be apparent to those skilled in the art that various modifications and variations can be made to the structure of the present invention without departing from the scope or spirit of the present invention. In view of the foregoing, it is intended that the present invention cover modifications and variations of this invention provided they fall within the scope of the following claims and their equivalents.

What is claimed is:

1. An electronic apparatus, comprising:
a processor, configured for executing an operating system and loading a basic input/output system (BIOS) to execute an initialization program; and
a touch display module, comprising:
a touch display device having a virtual input area, wherein the touch display device generates a touch event when the touch display device is touched; and
a touch input controller coupled to the touch display device and the processor, the touch input controller receiving the touch event and generating a coordinate value according to the touch event,
wherein, when the electronic apparatus has loaded the initialization program and the electronic apparatus has not loaded the operating system, the touch display module is defined to comprise a human interface device comprising a virtual keyboard, and the virtual input area displays an input interface comprising a plurality of functional key icons, wherein each of the functional key icons corresponds to a key of the virtual keyboard;
wherein when the coordinate value is located in the input interface at a position corresponding to one of the plurality of functional key icons, the touch input controller transform the coordinate value into a corresponding functional code of the human interface device, and the processor executes a corresponding operation according to the functional code; and
wherein when the coordinate value is not in the input interface, the touch input controller transmits the coordinate value to the processor.

2. The electronic apparatus as claimed in claim 1, wherein after the electronic apparatus loads the operating system, the touch display module is defined to comprise a touch screen.

3. The electronic apparatus as claimed in claim 1, wherein when the electronic apparatus loads the initialization program and has not loaded the operating system, the touch display module is further defined to comprise the human interface device and a touch screen.

4. The electronic apparatus as claimed in claim 3, wherein the touch display device further comprises a touch region, the touch region is not overlapped with the virtual input area, and when the coordinate value locates in the touch region, the processor executes an operation according to the coordinate value,
wherein the human interface device corresponds to the virtual input area, and the touch screen corresponds to the touch region.

5. The electronic apparatus as claimed in claim 1, wherein the electronic apparatus loads the initialization program to perform an initialization operation,
wherein after the electronic apparatus completes the initialization operation, the processor executes and loads the operating system.

6. The electronic apparatus as claimed in claim 1, wherein when the coordinate value locates outside of the input interface, the coordinate value does not correspond to any functional code of the human interface device.

7. The electronic apparatus as claimed in claim 1, wherein the processor executes a functional-key function according to the functional code.

8. A method of displaying images via touching, adapted to an electronic apparatus, wherein the electronic apparatus has a touch display module and the touch display module has a touch display device, the method of displaying images via touching comprising:
loading a basic input/output system (BIOS) to perform an initialization operation of the electronic apparatus, when the electronic apparatus has not loaded an operating system;
defining the touch display module to have a human interface device comprising a virtual keyboard, the touch display device having a virtual input area comprising a plurality of functional key icons, wherein each of the functional key icons corresponds to a key of the virtual keyboard;
displaying an input interface on the virtual input area;
generating a touch event when the touch display device is touched;
generating a coordinate value according to the touch event;
when the coordinate value is located in the input interface at a position corresponding to one of the functional key icons, transforming the coordinate value into a corresponding functional code of the human interface device; and
executing a corresponding operation according to the functional code; and
wherein when the coordinate value is not in the input interface, the touch input controller transmits the coordinate value to the processor.

9. The method of displaying images via touching as claimed in claim 8, further comprising:
defining the touch display module as a touch screen after the electronic apparatus loads the operating system.

10. The method of displaying images via touching as claimed in claim 8, wherein defining the touch display module to have the human interface device comprises:
defining the touch display module to comprise the human interface device and a touch screen when the electronic apparatus has not loaded the operating system.

11. The method of displaying images via touching as claimed in claim 10, wherein the touch display device further comprises a touch region, the touch region is not overlapped with the virtual input area, and when the coordinate value locates in the touch region, the processor executes an operation according to the coordinate value,
wherein the human interface device corresponds to the virtual input area, and the touch screen corresponds to the touch region.

12. The method of displaying images via touching as claimed in claim 8, wherein executing the initialization program of the electronic device comprises:
controlling the electronic device to load the initialization program to execute an initialization operation.

13. The method of displaying images via touching as claimed in claim 8, wherein when the coordinate value locates outside of the input interface, the coordinate value does not correspond to any functional code of the human interface device.

14. The method of displaying images via touching as claimed in claim 8, wherein executing the corresponding operation according to the functional code comprises:

executing a functional key function according to the functional code.

15. The electronic apparatus of claim 1, wherein the virtual keyboard is a virtual alpha-numeric keyboard comprising a plurality of alpha-numeric keys.

16. The electronic apparatus of claim 1, wherein the virtual keyboard is a virtual numeric keypad comprising a plurality of numeric keys.

17. The method of displaying images via touching of claim 8, wherein the virtual keyboard is a virtual alpha-numeric keyboard comprising a plurality of alpha-numeric keys.

18. The method of displaying images via touching of claim 8, wherein the virtual keyboard is a virtual numeric keypad comprising a plurality of numeric keys.

* * * * *